(12) United States Patent
Bhattacharya et al.

(10) Patent No.: US 12,490,038 B2
(45) Date of Patent: Dec. 2, 2025

(54) APPARATUS AND METHODS FOR DETECTING A MICROPHONE CONDITION

(71) Applicant: Cirrus Logic International Semiconductor Ltd., Edinburgh (GB)

(72) Inventors: Anindya Bhattacharya, Austin, TX (US); Bhoodev Kumar, Austin, TX (US); Jaimin Mehta, Austin, TX (US); Yongsheng Shi, Austin, TX (US); Aleksey S. Khenkin, Austin, TX (US); John L Melanson, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/187,186

(22) Filed: Mar. 21, 2023

(65) Prior Publication Data

US 2023/0262404 A1 Aug. 17, 2023

Related U.S. Application Data

(63) Continuation of application No. 17/108,433, filed on Dec. 1, 2020, now Pat. No. 11,641,558.

(60) Provisional application No. 63/071,109, filed on Aug. 27, 2020.

(51) Int. Cl.
*H04R 29/00* (2006.01)
(52) U.S. Cl.
CPC .................................. *H04R 29/004* (2013.01)
(58) Field of Classification Search
CPC ....................................................... H04R 29/00
See application file for complete search history.

(56) References Cited

U.S. PATENT DOCUMENTS

| | | | |
|---|---|---|---|
| 5,153,532 A | 10/1992 | Albers et al. | |
| 2008/0075306 A1* | 3/2008 | Poulsen | H04R 29/004 |
| | | | 381/59 |
| 2016/0080879 A1 | 3/2016 | Wiesbauer et al. | |
| 2016/0127845 A1 | 5/2016 | Cagdaser et al. | |
| 2017/0055056 A1* | 2/2017 | Rocca | H03F 3/183 |
| 2017/0142519 A1 | 5/2017 | Lasseuguette | |
| 2017/0238108 A1* | 8/2017 | Muza | H04R 19/005 |
| | | | 381/58 |
| 2018/0084343 A1* | 3/2018 | Straeussnigg | H04R 29/004 |
| 2019/0187172 A1 | 6/2019 | Thompson et al. | |
| 2020/0233039 A1* | 7/2020 | Jorgensen | H03F 3/181 |

(Continued)

FOREIGN PATENT DOCUMENTS

WO 2019133646 A1 7/2019

OTHER PUBLICATIONS

Marple, Jr., "Estimating group delay and phase delay via discrete-time "analytic" cross-correlation", Sep. 1999, IEEE, IEEE Transactions on Signal Processing vol. 47, No. 9, pp. 2604-2607. (Year: 1999).*

(Continued)

*Primary Examiner* — Daniel R Sellers
(74) *Attorney, Agent, or Firm* — Jackson Walker L.L.P.

(57) ABSTRACT

A method and apparatus for detecting a microphone condition of a microphone, the method comprising: applying an electrical stimulus to a microphone; measuring an electrical response to the electrical stimulus at the microphone; comparing the electrical response to an expected response; and determining the microphone condition based on the comparison.

23 Claims, 10 Drawing Sheets

(56) References Cited

U.S. PATENT DOCUMENTS

2020/0249052 A1* 8/2020 Steele .................... G01D 5/24
2020/0329324 A1* 10/2020 Loeppert ................ H04R 3/04

OTHER PUBLICATIONS

Partial International Search Report and Preliminary Opinion of the International Searching Authority, International Application No. PCT/GB2021/051920, mailed Nov. 4, 2021.
Anonymous: "Application Note AN-1112 Microphone Specifications Explained", Jun. 15, 2016, pp. 1-11, Retrieved from the Internet: URL:https://invensense.tdk.com/wp-content/upi oads/2815/82/AN-1112-vl. I. pdf [retrieved on 2821-18-26].

* cited by examiner

APPARATUS AND METHODS FOR DETECTING A MICROPHONE CONDITION

The present disclosure is a continuation of U.S. Non-Provisional patent application Ser. No. 17/108,433, filed on Dec. 1, 2020, which claims priority to U.S. Provisional Patent Application Ser. No. 63/071,109, filed Aug. 27, 2020, each of which is incorporated by reference herein in its entirety.

TECHNICAL FIELD

The present disclosure relates to methods and apparatus for detecting the presence or condition of a microphone.

BACKGROUND

Personal audio devices, such as smartphones and headphones, typically comprise multiple integrated microphone transducers used to convert human speech into electrical audio signals. Over time, deterioration of the microphones can lead to changes in response characteristics which can impact the effectiveness of audio processes implemented by the personal audio devices, which rely on those response characteristics.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to a first aspect of the disclosure, there is provided a method for detecting a microphone condition of a microphone, the method comprising: applying an electrical stimulus to a microphone; measuring an electrical response to the electrical stimulus at the microphone; comparing the electrical response to an expected response; and determining the microphone condition based on the comparison.

The microphone may comprise a transducer and an amplifier integrated on an integrated circuit (IC). The transducer may be a MEMS transducer. The amplifier may be configured to output an analogue audio signal. In some embodiments, the microphone may comprise an analogue-to-digital converter (ADC) and output a digital audio signal. The ADC may be integrated on the integrated circuit. One or more of the transducer, the amplifier and the ADC may be powered in use by a power supply. In some embodiments, power may be provided via the IC.

The electrical stimulus may be applied to one or more audio output terminals of the microphone. The microphone may be a single-ended microphone, in which case the electrical stimulus may be a single-ended current applied between one of the one or more audio output terminals and one of a ground terminal and a power terminal of the microphone. Alternatively, the microphone may be a differential microphone, in which case the electrical stimulus may be a differential current applied between the audio output terminals of the microphone.

Measuring the electrical response may comprise detecting a condition, such as a load current, or a voltage drop or an impedance, at the audio output terminals.

Measuring the electrical response may further comprise determining an impedance of the microphone based on the detected condition at the output terminals. Comparing the electrical response to the expected response may comprise: comparing the impedance to an expected impedance of the microphone.

The impedance may be a differential impedance or a single-ended impedance.

In some embodiments, one or more of a frequency, an amplitude, and a phase of the electrical stimulus may be varied over time.

In some embodiments, one or more characteristics of the electrical stimulus are randomly or pseudo-randomly generated.

The electrical stimulus may comprise a plurality of frequency components.

The method may further comprise: detecting the presence of interference in a first component of the measured electrical response. Comparing the electrical response to the expected response may comprise comparing a second component of the electrical response different to the first component to the expected response.

The first component of the measured response may be comprised in a first frequency bin and the second component of the measured response may be comprised in a second frequency bin different to the first frequency bin.

The first component of the measured response may be comprised in a first time period. The second component of the measured response may be comprised in a second time period preceding or following the first time period.

Comparing the electrical response to the expected response may comprise: determining one or more frequencies of the electrical response; and comparing the one or more frequencies with one or more expected frequencies of the expected response.

The one or more frequencies of the electrical response may be determined using a zero-crossing detector.

Comparing the electrical response to the expected response may comprise determining a group delay associated with the microphone; and comparing the group delay with an expected group delay of the expected response. Comparing the group delay may comprises cross-correlating the electrical response with the expected response.

Comparing the electrical response to the expected response may comprise: determining an amplitude of the electrical response; and comparing the amplitude with an expected amplitude of the expected response. The method may further comprising normalising the electrical response.

The amplitude may be determined for a single frequency bin of the electrical response and the expected amplitude may be for a single frequency bin of the expected response. The amplitude may be determined for a single frequency bin of the electrical response using discrete Fourier transform, DFT, algorithm or a Goertzel algorithm.

Additionally or alternatively to the above, the electrical stimulus may be applied to a power terminal of the microphone. The electrical response may be measured at the power terminal of the microphone. The electrical stimulus may comprise a bias voltage for biasing the microphone. The electrical response may comprises a bias current of the microphone.

The bias voltage may be varied over time during measurement of the bias current.

The electrical response may be measured at one or more output terminals of the microphone. Measuring the electrical response may comprise measuring a common-mode output voltage of the microphone or a common-mode output impedance of the microphone or a differential impedance of the microphone.

The electrical stimulus applied to the power terminal of the microphone may be modulated. Measuring the electrical response may comprise measuring a power supply rejection, PSR, characteristic of the microphone. Comparing the electrical response to the expected electrical response may comprise comparing the PSR characteristic to an expected PSR characteristic of the microphone.

Measuring the PSR characteristic may comprise measuring a differential PSR or a common-mode PSR.

The electrical response or any characteristic thereof may be compared to the expected response using a polynomial equation or a look-up table.

The method may further comprise determining an operating mode of the microphone. The expected response may be determined based on the determined operating mode of the microphone.

The operating mode may comprise a high performance, HP, mode or a low power, LP, mode or a powered-down mode.

The method may further comprise changing the operating mode of the microphone and repeating the method for each change in operating mode. The expected response may be updated for each change in operating mode.

Determining the microphone condition may comprises: determining the presence of microphone and/or a fault in the microphone.

The method may further comprise applying a second electrical stimulus, one or more characteristics of the second electrical stimulus determined based on the comparison between the electrical response and the expected response.

According to another aspect of the disclosure, there is provided an apparatus for detecting a microphone condition of a microphone, the apparatus comprising processing circuitry and a non-transitory machine readable medium which, when executed by the processing circuitry, cause the apparatus to perform a method as described above. The apparatus may be a personal audio device. The apparatus may comprise the microphone.

According to another aspect of the disclosure, there is provided an apparatus for detecting a microphone condition of a microphone, the apparatus comprising processing circuitry and a non-transitory machine readable medium which, when executed by the processing circuitry, cause the apparatus to perform a method comprising: applying an electrical stimulus to a microphone; measuring an electrical response to the electrical stimulus at the microphone; comparing the electrical response to an expected response; and determining the microphone condition based on the comparison.

The apparatus may be a personal audio device. The apparatus may comprise the microphone.

According to another aspect of the disclosure, there is provided a non-transitory machine-readable medium storing instructions thereon which, when executed by one or more processors, cause an electronic apparatus to perform the method described above.

According to another aspect of the disclosure, there is provided a method for determining a condition of a transducer, the method comprising: applying an acoustic stimulus at the transducer using a haptic actuator; detecting a response signal derived by the transducer; and determining a condition of the transducer based on the response signal.

The haptic actuator comprises a linear resonant actuator, LRA. The transducer may be a microphone or a speaker.

The transducer and the haptic actuator may be comprised in a device, such as a personal audio device.

According to another aspect of the disclosure, there is provided an apparatus for determining a condition of a transducer, the apparatus comprising processing circuitry and a non-transitory machine readable medium which, when executed by the processing circuitry, cause the apparatus to perform a method comprising: applying an acoustic stimulus at the transducer using a haptic actuator; detecting a response signal derived by the transducer; and determining a condition of the transducer based on the response signal.

The apparatus may further comprising the transducer and the haptic actuator. The haptic actuator comprises a linear resonant actuator, LRA. The transducer may be a microphone or a speaker.

The apparatus may be a personal audio device.

According to another aspect of the disclosure, there is provided a non-transitory machine-readable medium storing instructions thereon which, when executed by one or more processors, cause an electronic apparatus to perform the method described above.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to methods and apparatus for sensing conditions at or of microphone. For example, embodiments of the present disclosure allow the measurement of microphone characteristics by applying an electrical stimulus to one or more terminals of the microphone and measuring one or more electrical responses. By comparing measured characteristics to expected (e.g. stored) values, a determination of the condition of the microphone can be made. Such a determination may comprise, for example, the presence or absence of the microphone, a fault in the microphone or damage to the microphone's enclosure, or an operating mode of the microphone to name a few.

Figure 1A:
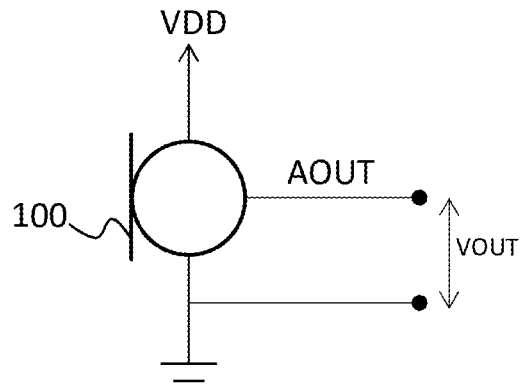
FIG. 1A is a schematic diagram of a single-ended microphone.
Figure 1B:
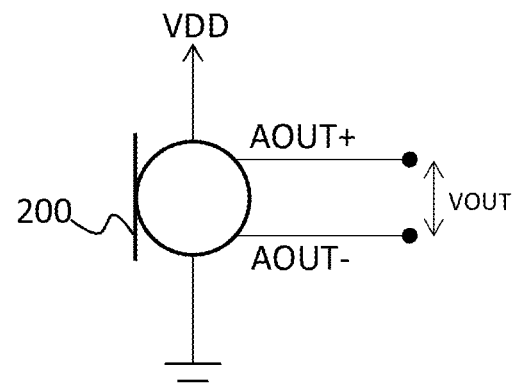
FIG. 1B is a schematic diagram of a differential microphone.

FIGS. 1A and 1B schematically illustrate a single-ended microphone 100 having a single audio output terminal and a differential microphone 200 having a pair of differential audio output terminals, respectively. Each microphone 100, 200 may comprise a transducer, such as a micro-electromechanical system (MEMS) transducer and an amplifier for amplifying signals generated by the MEMS structure (neither shown). The MEMS transducer and the amplifier may be provided on an integrated circuit (IC), such as an application specific integrated circuit (ASIC). The amplifier may be configured to output an analogue audio signal. One or more of the transducer and the amplifier may be powered in use by a power supply. In some embodiments, power may be provided via the IC.

The following embodiments are described with reference to the microphone 100, 200 outputting analogue audio signals. In a variation, the microphones 100, 200 may further comprise an analogue-to-digital converter (ADC) coupled to a respective amplifier and configured to output a digital audio signal. In which case, the ADC may be integrated with the transducer and the amplifier.

The single-ended microphone 100 comprises three terminals; a ground reference terminal GND, a power terminal for applying a bias voltage VDD, and an output terminal AOUT. The voltage VOUT between the output terminal and ground represents the sound pressure at the microphone 100.

The differential microphone 200 comprises four terminals: a ground terminal GND, a power terminal for applying a microphone bias voltage VDD, and a pair of output terminals AOUT+, AOUT−. The voltage difference VOUT between the voltage at each of the pair of output terminals AOUT+ and AOUT− represents the sound pressure incident at the microphone 200. The differential nature of the microphone 200 tends to provide the differential microphone 200 with a higher dynamic range when compared to the single-ended microphone 100 under the same supply voltage VDD conditions.

As mentioned above, various embodiments of the disclosure aim to characterise the condition of microphones such as the microphones 100, 200 described above. For clarity, the following examples will be described primarily with reference to the differential microphone 200. It will be appreciated, however, that many of the techniques described below are equally applicable to the single-ended microphone 100 shown in FIG. 1. For example, instead of applying an electrical stimulus to the differential audio outputs of the differential microphone 200, an electrical stimulus may be applied between the single-ended output AOUT of the microphone 100 and ground GND. For example, instead of measuring an electrical response at the differential audio outputs AOUT+, AOUT− of the differential microphone 200, an electrical response may be measured between the single-ended output AOUT of the microphone 100 and ground GND. Some of the techniques described below, however, specific to the analysis of differential microphones, may be applicable only to differential microphones such as the microphone 200 of FIG. 1B.

Figure 2:
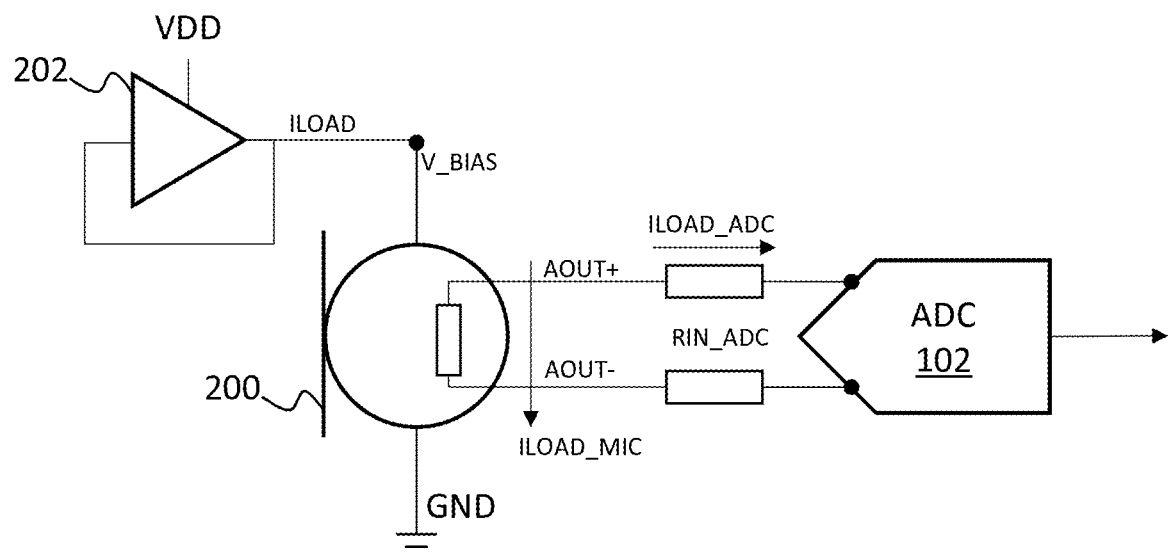
FIG. 2 is a schematic diagram of a system comprising the differential microphone.

FIG. 2 is a block diagram of a typical implementation of the microphone 200 shown in FIG. 1B for acquisition of a digital representation of the sound pressure incident at the microphone 200. A microphone biasing amplifier 202 is provided to bias the microphone 200 via the power terminal (represented by the microphone load ILOAD_MIC). The microphone terminals AOUT+, AOUT− are connected to the inputs of an analogue-to-digital converter (ADC) 204 which converts the difference between the audio output signals AOUT+, AOUT− into a digital representation of the sound pressure incident at the microphone 200.

Typically, when the microphone 200 is powered down, the bias voltage V_BIAS is switched off. In some embodiments, the microphone 200 is disconnected, either from the microphone biasing amplifier 202, or the ADC 102, or both.

The microphone 200 (and microphone 100) has a set of electrical characteristics. These characteristics may be dependent on the physical structure and material of the microphone 200 or its enclosure (not shown). These characteristics may also depend on the electrical stimulus being applied at terminals of the microphone 200. The inventors have realised that some or all of these characteristics may be evaluated by measuring one or more electrical properties at one or more terminals of the microphone. Moreover, by applying a known stimulus to one or more terminals (e.g. voltage or ground terminals or audio output terminals) and subsequently measuring an electrical signal at one or more of those terminals (e.g. voltage or ground terminals or audio output terminals), a determination of electrical characteristics of the microphone 200 can be ascertained. In turn, a condition of the microphone 200 may be ascertained.

Such characterisation may be used in a number of applications. For instance, where the microphone 200 is incorporated into an electrical device, probing of the microphone 200 using a known electrical stimulus and subsequently measuring an electrical response may be used to diagnose a status of the microphone (e.g. a presence, a fault, a condition or an operating mode) or determine whether the microphone has been tampered with. For example, embodiments described herein may be used to detect whether a microphone is connected, for example when it is supposed to be disabled or disconnected. Embodiments described herein may be used to determine the authenticity of the microphone, for example before processing subsequent audio signal for other applications.

Figure 3:
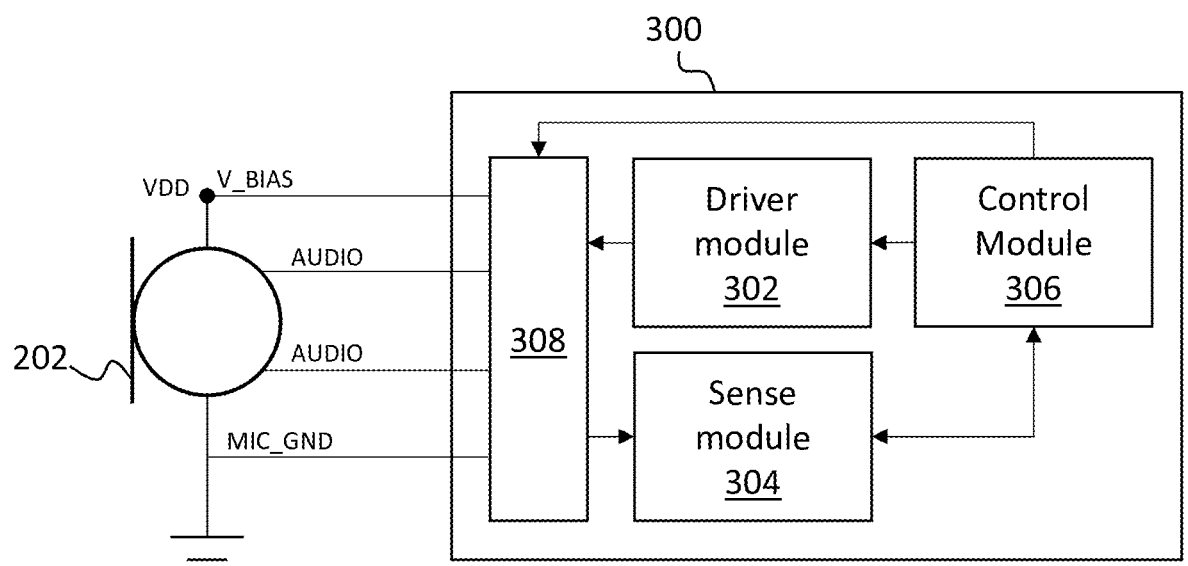
FIG. 3 is a block diagram of a system for detecting a condition of the microphone of FIG. 1B.

FIG. 3 is a block diagram providing an overview of the system 300 according to embodiments of the present disclosure for detecting and/or characterising a condition at the microphone 200. The system comprises a driver module 302, a sense module 304 and a control module 306. The system may comprise a selector module 308.

The system 300 may be coupled to one or more power terminals VBIAS, MICGND and/or audio terminals AOUT+, AOUT− of the microphone 200. Such coupling may be selective, for example via the selector module 308. The selector module 308 may be configured to selectively couple one or more of the power terminals VBIAS, MICGND and/or audio terminal AOUT+, AOUT− to each of the driver module 302 and the sense module 304. Such coupling may be sequential or simultaneous. For example, in some embodiments, the selector module 308 may be configured to simultaneously couple two or more of the power terminals VBIAS, MICGND and/or audio terminal AOUT+, AOUT− to the driver module 302 at any one time. Likewise, the selector module 308 may be configured to simultaneously couple two or more of the power terminals VBIAS, MICGND and/or audio terminal AOUT+, AOUT− to the sense module 304 at any one time. The selector module 308 may be controlled by the control module 306 to implement switching (and thus routing) of signals between each of the driver module 302 and the sense module 304 and the one or more of the power terminals VBIAS, MICGND and/or audio terminal AOUT+, AOUT−. The selector module 308 may be implemented using one or more multiplexers or the like. Such regimes are well known in the art and so will not be described in more detail here.

In alternative embodiments, any switching implemented by the selector module 308 may instead be implemented by the driver module 302 or the sense module 304 or both. In yet further embodiments, one or more of the power terminals VBIAS, MICGND and/or audio terminal AOUT+, AOUT− may be permanently or semi-permanently coupled to the driver module 302 and/or the sense module 304.

The driver module 302 may be configured to generate one or more electrical stimulus for application to one or more of the power terminals MICBIAS, MICGND and/or audio terminals AOUT+, AOUT−. In some embodiments, the driver module 302 may be configured to generate multiple electrical stimuli and apply each stimulus to a different one of the power terminals MICBIAS, MICGND and/or audio terminals AOUT+, AOUT−, either in sequence or at the same time. In some embodiments, the driver module 302 may be configured to apply the same electrical stimulus to a different one of the power terminals MICBIAS, MICGND and/or audio terminals AOUT+, AOUT−, either in sequence or at the same time. The driver module 302 may be controlled by the control module 306.

The sense module 304 may be configured to receive and measure an electrical response to any electrical stimulus applied to the microphone 200 by the driver module 302. The sense module 304 may be controlled and configured by the control module 306 to measure one or more electrical characteristics of the response. The sense module 304 may send measurements of any electrical response to the control module 306 for further processing.

In some embodiments, the sense module 304 may be implemented by a module already present in the system 300 for the processing of audio signals received from the microphone 200. For example, the sense module 304 may form part of a signal processing chain for processing of audio content in a device such as a smartphone. Equally, one or more functions of the driver module 302 and/or the control module 306 may also be implemented by modules designed for the driving of audio signals and the control of playback and/or audio processing in a device, such as a smartphone.

As mentioned above, the control module 306 may be configured to control each of the driver module 302, the sense module 304 and the selector module 308. In doing so, the control module 306 may coordinate the application of one or more electrical stimulus to one or more terminals of the microphone 200 (by the driver module 302 via the selector module 308) as well as receipt, measurement and/or analysis of one or more electrical responses to the one or more electrical stimuli (by the sense module 304 via the selector module 308).

The control module 306 may also be configured to analyse any measured electrical responses. Such analysis may comprise comparing the responses to one or more expected responses associated with the microphone 200 being evaluated. Such analysis may comprise providing any measured electrical responses to a neural network or machine learning algorithm for characterisation.

The control module 306 may also be configured to control the driver module 302 to generate and apply electrical stimuli based on previous measured electrical responses (e.g. from a previous stimulus) or based on analysis of such previous measured electrical responses. Such closed loop feedback may be used to tailor one or more subsequent electrical stimuli to improve the function of subsequent electrical responses for determining a condition of the microphone 200.

The system 300 may thus be configured to enable the driver module 302 and the sense module 304 to apply an electrical stimulus to any combination of terminals of the microphone 200 as well as sense or measure an electrical signal at any combination of terminals of the microphone 200. As such, the driver module 302 and/or the sense module 304 may comprise circuitry configured to enable stimulation and measurement of electrical characteristics of the microphone 200. Examples of such circuitry will now be described with reference to FIGS. 4 to 8.

Figure 4:
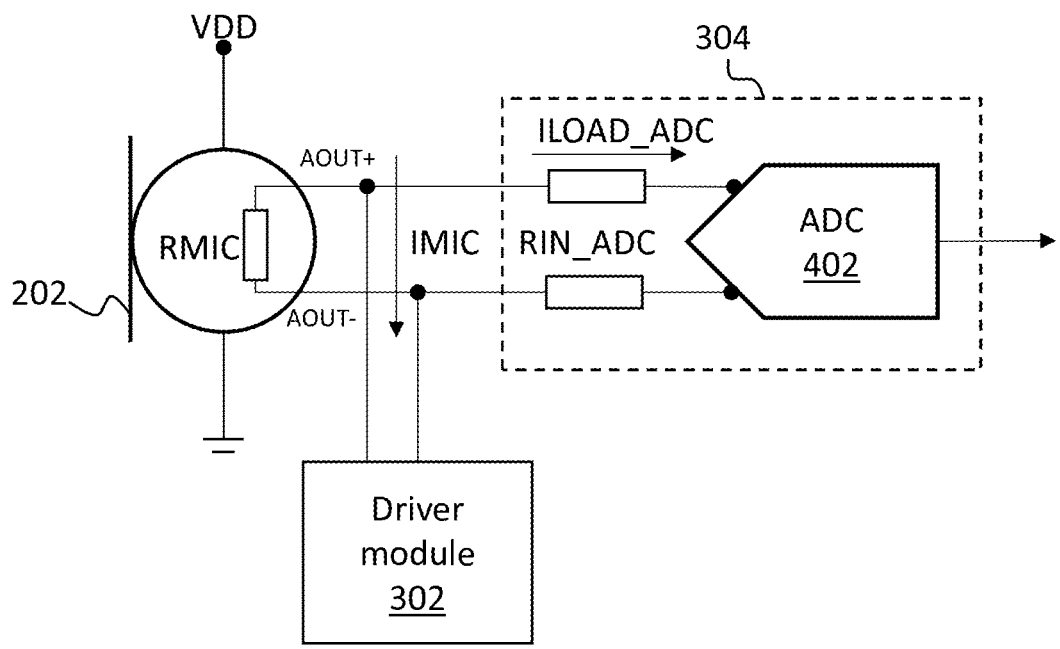
FIG. 4 is a schematic diagram showing an example implementation of the system of FIG. 3.

FIG. 4 is a block diagram of example circuitry which may be implemented by the system 300 for measurement of an impedance RMIC of the microphone 200. For clarity, the control module 306 and the selector module 308 are not shown.

The driver module 302 is coupled to the audio output terminals AOUT+, AOUT− of the microphone 200 and configured to apply a current IMIC across the microphone terminals, indicated in FIG. 4 by the resistance RMIC in the microphone. The sense module 304 may then be configured to measure the voltage drop across the microphone 200 responsive to the applied current, for example using an ADC 402. With knowledge of the current IMIC applied by the driver module 302 and the measured voltage difference at the two terminals AOUT+, AOUT−, the impedance RMIC of the microphone 200 may be determined using the ADC 402. The digital output of the ADC 402 may thus represent the impedance RMIC of the microphone 200.

It will be appreciated that the ADC 402 may have an inherent input impedance RIN_ADC which itself may induce a current ILOAD_ADC. With knowledge of the input impedance RIN_ADC of the ADC 402, the digital output from the ADC 402 may be calibrated to remove any components representative of the voltage drop across the input impedance RIN_ADC. Accordingly, in some embodiments the input impedance RIN_ADC of the ADC 402 may be measured during test or calibration and compared with the expected impedance RMIC of the microphone 200. A gain correction factor may then be implemented in the digital domain to remove the gain error due to the current ILOAD_ADC. In some embodiments, the gain correction factor may be determined by applying Kirchhoff's current law (KCL) to the audio output terminals AOUT+, AOUT− of the microphone 200. In some embodiments, the gain correction factor may be equal to (1−(RMIC/RIN_ADC)).

In some embodiments, the driver module 302 may comprise a digital to analogue converter (DAC). In which case, both the application of the electrical stimulus as well as the sensing of the electrical response at the audio terminals may be respectively controlled and processed in the digital domain. In some embodiments, the DAC incorporated into the driver module 302 may be a pulse width modulation (PWM) based current mode DAC.

In some embodiments, the driver module 302 may be configured to apply the voltage across the audio terminals AOUT+, AOUT− during power up. The sense module 304 may also be configured to detect a response at the audio terminals AOUT+, AOUT− during power up. The measured microphone impedance may vary over time during power-up, due to the parasitic nature of the microphone 200. In which case, the impedance of the microphone 200 may be approximated using a polynomial and compared to a stored expected polynomial for a power-up cycle of the microphone 200. Alternatively, impedance values over time during the power-up may be compared to values in a stored look-up table of expected values during a power-up cycle of the microphone 200.

In some embodiments, the driver module 302 may apply a signal having multiple frequency components. The multiple frequencies may be simultaneous or distributed over time. By providing two or more frequency components, a more comprehensive characterisation of impedances of the microphone (responsive to multiple frequencies applied to the microphone audio terminals AOUT+, AOUT−) may be obtained.

In some embodiments, particularly where the electrical stimulus comprises multiple frequency components, the sense module 304 may be configured to detect a response at multiple frequencies. By measuring microphone impedance at multiple frequencies, more information concerning the microphone 200's electrical characteristics can be obtained. Again, this measured impedance data may be compared to a stored polynomial or look-up table comprising expected impedance values at different frequencies. In some embodiments, the ADC 402 may be configured in an ultrasonic bandwidth mode to enable high frequency measurements (e.g. above 20 kHz) to be performed, thus providing even more information regarding the microphone 200's impedance characteristics.

In some embodiments, a correlation, such as a cross-correlation or convolution, between the signal applied at the audio terminals AOUT+, AOUT− of the microphone 200 and the signal measured by the sense module 304 may be used as an indication of a condition at the microphone 200. To detect the frequency of the signal received at the sense microphone, zero crossing based frequency detection may be implemented (as is known in the art).

In some embodiments, the driver module 302 may be configured to apply a signal at the audio terminals AOUT+, AOUT− of the microphone 200 which is time variant. For example, the signal applied by the driver module 302 may vary over time in frequency and/or amplitude and/or phase. In some embodiments, such time variation may be randomised or pseudo-randomised. In doing so, the chance of a third-party device successfully imitating the driver module 302, for example during a spoofing attack, is reduced. In some embodiments, the control module 306 may be configured to control the driver module 302 to apply a signal at the audio terminals AOUT+, AOUT− of the microphone 200 dependent on the sensed electrical response from the microphone 200. For example, on determination of interference in the sensed electrical response, a subsequent electrical stimulus may be adapted to have a different component (e.g. a different frequency range) where interference is not present in the electrical response of the microphone 200.

In some embodiments, a group delay associated with the signal chain, for example between the driver module 302, the microphone 200 and the sense module 304 may be determined and compared to an expected group delay. Particularly at high sampling rates (e.g. of the ADC 402 or the DAC of the driver module 302 if present), cross correlation may be used to determine time delay between signals at high resolution. In some embodiments, the driver module 302 may be configured to generate a signal to be applied to the microphone 200 comprising a chirp pattern. In doing so, the accuracy of any group delay measurement may be increased due to the temporal nature of the electrical stimulus.

In some embodiments, the amplitude of the signal measured by the sense module 304 may be detected, for example by normalising the digital output from the ADC 402 and determining one or more minimum or maximum amplitudes of the resultant signal. Alternatively, a single point Fourier transform (e.g. FFT or DFT) may be calculated on an expected tone bin to determine whether a frequency component exists in that bin. This may be performed using a Goertzel or similar DFT algorithm.

The control module 306 may be configured to store one or more expected values (e.g. of amplitude, frequency, group delay etc). Such expected values may be stored for multiple operating modes of the microphone 200. As noted above, one or more polynomials or look-up tables may be stored by the control module 306 comprising modelling expected behaviour of the microphone 200 in various situations.

Figure 5:
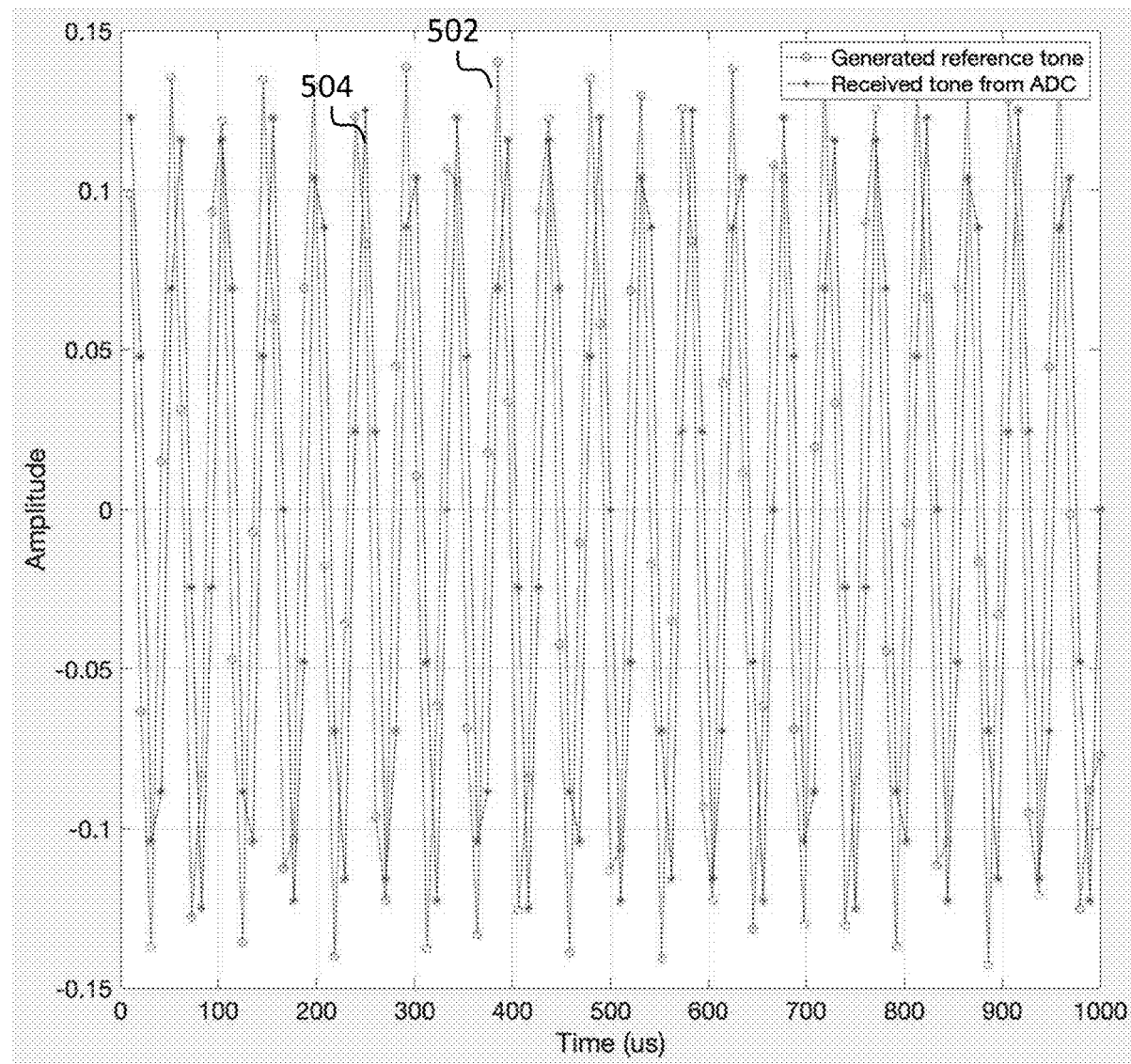
FIG. 5 is a graph comparing a reference signal and a signal measured at audio terminals of the microphone in FIG. 4.

FIG. 5 is a graph illustrating a digital representation 502 of a 21 kHz signal generated by the control module 306 and applied by the driver module 302 at the audio terminals of the microphone 200 AOUT+, AOUT− using a DAC of the driver module 302, and further illustrates the corresponding digital signal generated by the ADC 402 of the sense module 304 at a sampling frequency of 96 KHz. It can be seen that there is a correlation between the reference signal generated by the control module 306 and the digital representation of the electrical response measured by the sense module 304.

Figure 6:
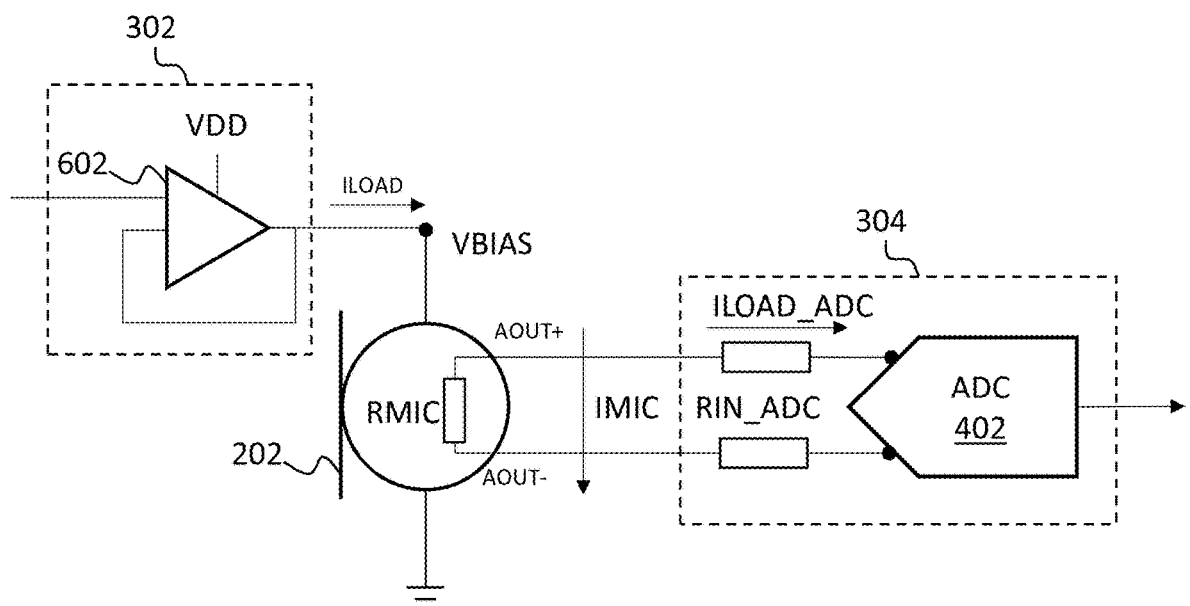
FIG. 6 is a schematic diagram showing an example implementation of the system of FIG. 3.

FIG. 6 is a block diagram of another example implementation of the system 300, also for measurement of the impedance RMIC of the microphone 200. The implementation shown in FIG. 6 may optionally be implemented alongside that shown in FIG. 5.

The inventors have realised that the microphone impedance RMIC is dependent on bias voltage of the microphone 200. Thus, in contrast to the implementation in FIG. 4, instead of (or in addition to) applying a voltage across the audio terminals AOUT+, AOUT− of the microphone 100, the driver circuit 302 comprises a biasing amplifier 602 configured to apply a known bias voltage to the power terminal VBIAS of the microphone 200. The impedance RMIC of the microphone 200 is thus measured by the sense module 304 in the same manner as that described with reference to FIG. 4. For many microphones, such as the microphones 100, 200 described herein, the impedance RMIC is mode-dependent since the microphones 100, 200 since the mode of operation the microphones 100, 200 is dependent on bias voltage VBIAS. For example, the microphone 200 may be switched between a high performance (HP) mode and a low power/performance (LP) mode by changing the bias voltages VBIAS applied at the power terminal of the microphone 200.

The control module 306 may thus be configured to control the driver module 302 to apply different bias voltages VBIAS associated with different modes of operation and control the sense module 304 to derive the microphone impedance RMIC based on the voltage drop across the microphone 200. The measured impedances may be compared to expected impedances of the microphone 200 for one or more modes to determine a condition of the microphone 200.

As with the embodiment described above, the amplitude, frequency, or chirp pattern of the signal applied to the power terminal of the microphone 200 may be varied to improve the resolution of measurement data derivable from the measured electrical response. Equally the sensing regimes described above with reference to FIG. 5 can equally be applied to the embodiment shown in FIG. 6.

As mentioned above, whilst this embodiment is described with reference to the differential microphone 200, the techniques described with reference in FIGS. 4 and 5 can equally be used to measure an impedance of the single-ended microphone 100 shown in FIG. 1. In such an embodiment, the driver module 302 may apply a voltage between the audio output terminal AOUT and the ground terminal GND, instead of between the differential audio output terminals AOUT+, AOUT−.

In addition to measuring the impedance RMIC of the microphone 200, the circuitry shown in FIG. 6 can be used to determine the common-mode behaviour of the microphone 200. The inventors have found that the audio outputs AOUT+, AOUT− of the microphone 200 have a well-defined common mode output voltage which is dependent on the microphone 200, the performance mode of the microphone 200 and the respective bias voltage VBIAS applied to the power terminal of the microphone 200. Accordingly, in some embodiments, the sense module 304 may be configured to measure a common-mode voltage at the audio terminals AOUT+, AOUT−. For example, the sense module 304 may measure the common-mode voltage by time-averaging the output from the ADC 402. The measured common-mode voltage may then be compared to an expected common-mode voltage to determine a condition of the microphone 200. It will be appreciated that the above technique for determining common-mode voltage may also be used to determine a common-mode impedance at the audio terminals AOUT+, AOUT−. It will also be appreciated that the differential impedance may be determined in a similar manner and used as a diagnostic parameter, i.e. to determine a condition at or of the microphone. For example, the differential-mode voltage may be calculated as the difference between AOUT+ and AOUT− and the differential impedance determined based on that differential voltage.

The inventors have further realised that measured power supply rejection (PSR) can be used to determine a condition of the microphone 200.

Figure 7:
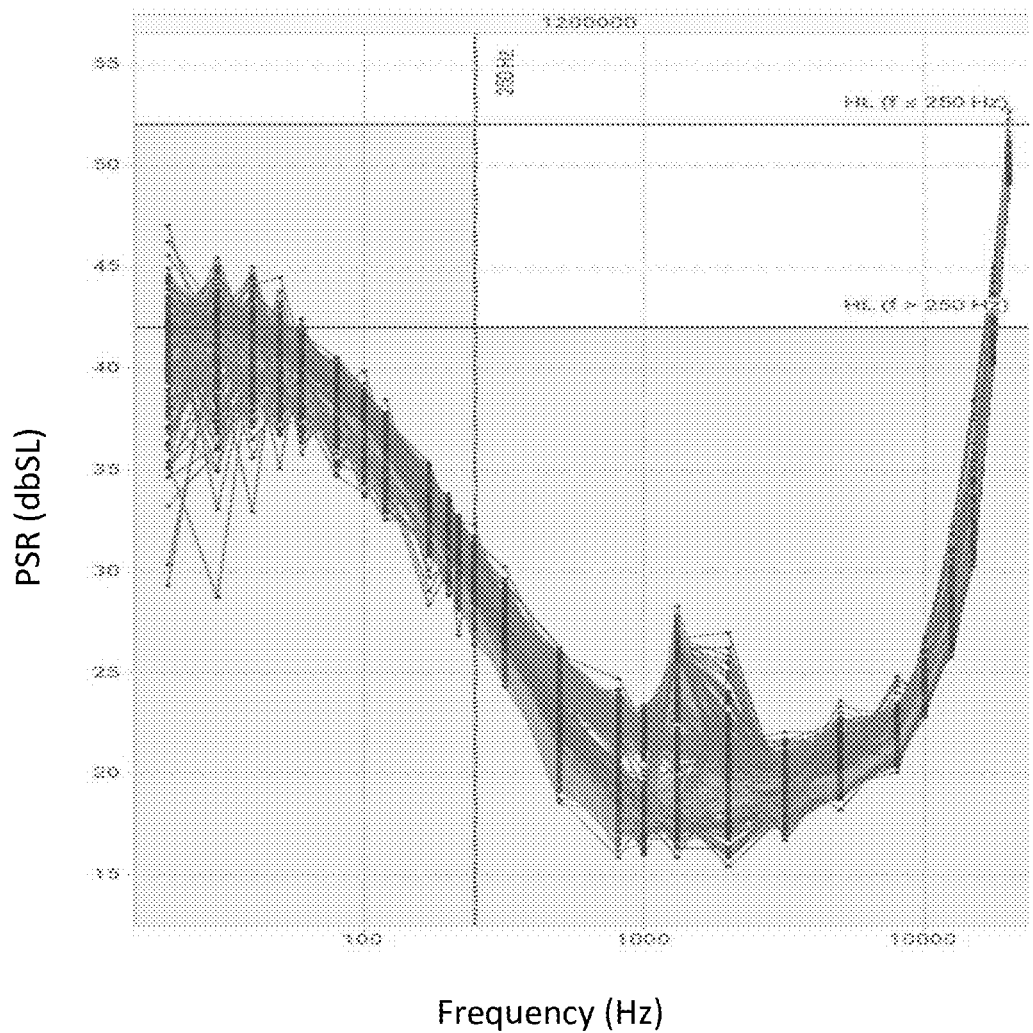
FIG. 7 is a graph showing power supply rejection over frequency for the microphone of FIG. 6.

FIG. 7 is a graph of power supply rejection vs frequency for the microphone 200. At high frequencies, PSR is proportional to frequency and is typically driven by parasitic capacitive coupling in the application specific integrated circuit (ASIC) of the microphone 200. At low frequencies, PSR is inversely proportional to frequency and is driven primarily by thermoacoustic coupling. The thermoacoustic coupling may be sensed by the transducer of the microphone 200 and can thus be used to assess the condition of the transducer of the microphone 200.

The embodiment shown in FIG. 6 may be used to measure PSR at the audio terminals AOUT+, AOUT− of the microphone 200. To do so, the control module 306 may control the driver module 302 to apply a modulated bias voltage VBIAS to the power terminal of the microphone 200. The ADC 402 of the sense module 304 may then be configured in an ultra-wideband mode to characterise the PSR of the microphone 200 over a wide bandwidth. The PSR may then be compared to an expected PSR of the microphone 200. For example, the PSR may be summarised using a calibrated polynomial based equation or a look-up table. The polynomial or look-up table may then be used to set thresholds for the received tone.

Figure 8:
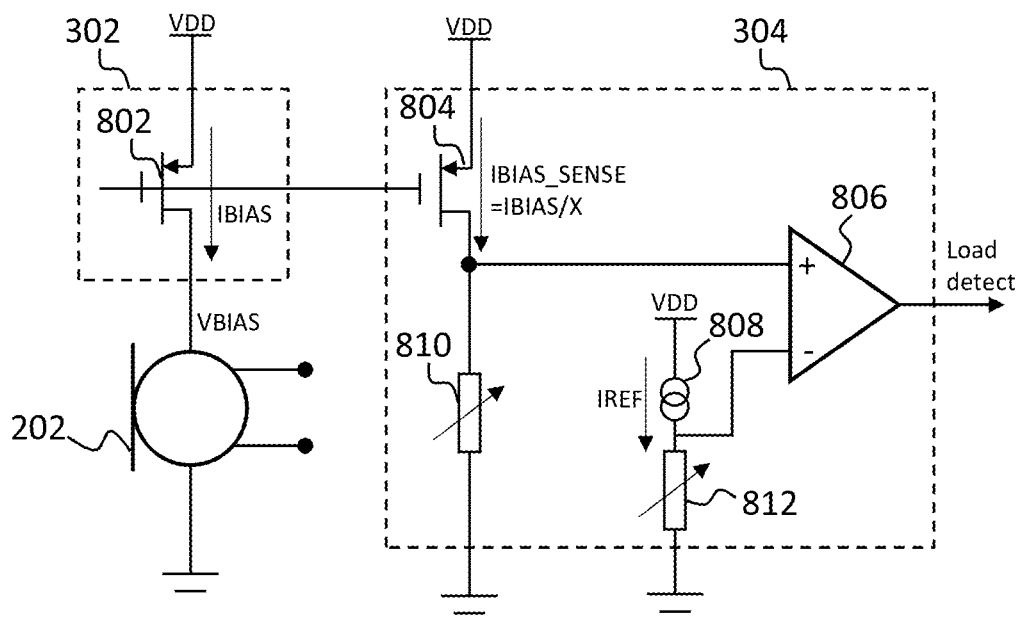
FIG. 8 is a circuit diagram of a driving and sensing circuit which may be implemented by the system shown in FIG. 3.

FIG. 8 is a schematic diagram of a circuit which may be implemented in the system 300 shown in FIG. 3. For clarity, the control module 306 and the selector module 308 are not shown. In this embodiment, the driver module 302 comprises a switching device 802, in this case PMOS device, configured to selectively allow a bias current to flow from a supply voltage VDD to the power terminal VBIAS through the switching device 802 on application of a voltage at its gate terminal. The source terminal of the switching device 802 is coupled to the supply voltage VDD. The drain of the switching device 802 is coupled to the power terminal VBIAS of the microphone 200. The gate voltage may be controlled by the control module 306.

The sense module 304 is configured to implement a current detection circuit comprising a current sense device 804, which in the illustrated example is a PMOS device. The current sense device 804 is preferably smaller than the switching device 802 (e.g. the gate width of the switching device 802 may be of the order of 10,000 times the gate width of the current sense device 804—i.e. X may be of the order of 10,000). The gate terminal of the current sense device 804 is coupled to the gate terminal of the switching device 802. The source terminal of the current sensing device 804 is coupled to the supply voltage VDD so as to provide a scaled copy of the current through the first switching device 802. Thus, the current sense device 804 acts as a current mirror. Thus if the current through the switching device 802 is IBIAS, then the current through the current sense device 804 is scaled by a factor of 1/X, i.e. the current IBIAS_SENSE through the current sense device 804 is equal to IBIAS/X.

Thus, the current at the drain of the current sense device 804 is provided to an input of a comparator 806 and compared to a reference current provided by the current source 808. When the current from the drain of the current sensing device 804 exceeds that of the reference level, a load detection signal is output. Variable resistors 810, 812 may be provided for configuration of the current threshold at the comparator 806 and may be controlled, for example, by the control module 306 or the sense module 304.

Thus, the current detection circuit implemented by the sense module 304 is able to measure the load current at the input terminals VBIAS of the microphone 200. This measured load current can be compared to a reference load current to determine a condition at the microphone 200. The condition may be a presence or absence of the microphone 200. Alternatively, the condition may be a performance mode of the microphone 200, since the microphone load current changes with performance mode.

The microphone load current may be detected, for example using the detection circuit shown in FIG. 8, during various phases of operation of the microphone. For example, the microphone load current may be measured during power-down of the microphone, where the load current should be zero or nearly zero. For example, the microphone load current may be measured during power-up of the microphone 200, at which time the load current may be time-varying, due to the capacitive nature of the MEMS device incorporated into the microphone 200 (if MEMS). The time-varying load current may be measured and compared to a stored expected polynomial or look-up table of expected load current (as is described above for impedance). For example, the microphone load current may be measured after power-up of the microphone 200, where the load current may be substantially stable for a particular performance mode, depending on the supply voltage VDD provided to the microphone 200. For any or all of these conditions, the microphone load current may be detected/measured by the sense module 304 to determine whether the microphone 200 is operating as expected.

In some embodiments, to determine whether the microphone 200 is behaving as expected, the power provided to the microphone 200, and therefore the performance mode, may be cycled multiple times to determine expected (or unexpected) repeated behaviour through the different modes of operation.

In any or all of the above methods for measuring electrical responses (impedance, current, voltage etc.), before using the measured electrical response for determining characteristics of the microphone, a determination regarding the quality of the received signal may be made. For example, the sense module 304 may determine, detect and/or monitor for the presence of interference in the measured electrical response. The interference may be due to any number of factors, not limited to acoustic noise at the microphone, electromagnetic interference and the like.

In some embodiments, the sense module 304 may detect the presence of electrical interference in a particular component of the measured electrical response (e.g. a frequency bin, or a time segment). Once it is determined that that particular component comprise interference, that component may be discarded by the sense module 304 and not used for subsequent measurement or characterisation of the microphone 200 or for determining a condition of the microphone 200. The sense module 304 may then use another component of the measured electrical response for analysis, comparison etc.

It will be appreciated that whilst the microphones shown in FIGS. 1A and 1B are analogue microphones and embodiments of the disclosure have been described with reference to the analogue microphones 100, 200, techniques described herein are equally applicable to digital microphones which output a digital representation of incident sound pressure. For example, where an electrical stimulus is applied to the power terminal VBIAS or the ground terminal GND of the microphone 200 and an electrical response is measured either at one or more audio terminals AOUT+, AOUT− or at the power terminal VBIAS, such techniques may equally be used to determine the condition of a digital microphone. The electrical response to the applied electrical stimulus may then be measured at one or more power terminals of the digital microphone or the digital output terminals of the digital microphone. In doing so, it will be appreciated that analogue-to-digital converters (ADCs) such as those described below, which convert an analogue audio signal into the digital domain, may be omitted where the condition of a digital microphone is being determined, since the output from such microphones will already be in the digital domain.

In the embodiments described above, electrical characteristics of microphones have been measured based on the application of one or more electrical stimulus to terminal(s) of the microphone 200. However, it may be advantageous to determine faults or malfunctions associated with MEMS devices if incorporated into the microphone 200 and, apart from the PSR (described above), many MEMS malfunctions do not affect the operation of the ASIC circuitry upon which they are manufactured. Thus MEMS faults can be difficult to test for solely using electrical testing techniques.

Embodiments of the present disclosure aim to address or at least ameliorate one or more of these issues by using a microphone's ability as a transducer for detecting acoustic signals in real-time.

Figure 9:
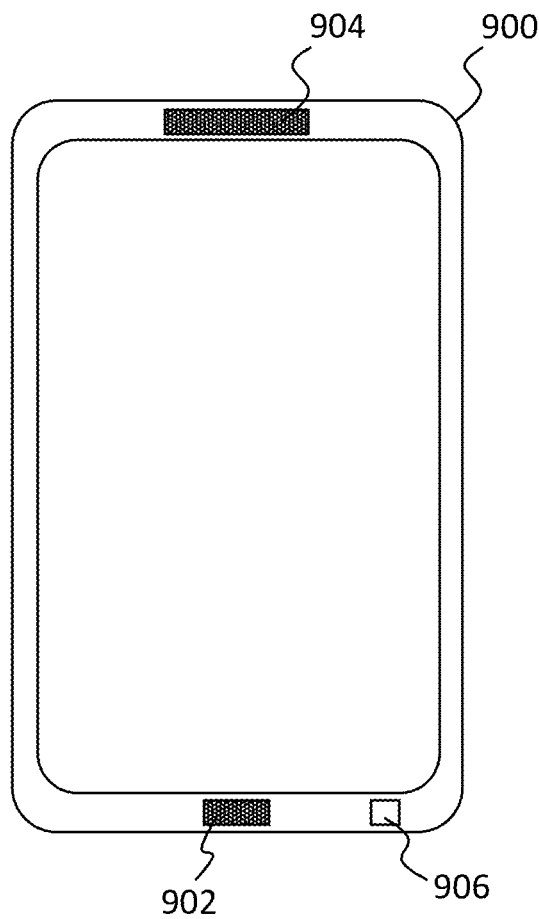
FIG. 9 is a diagram of a device.

FIG. 9 illustrates a device 900, in this case a smartphone. In other embodiments, the device 900 may be a portable and/or battery powered device such as a mobile computing device for example a laptop or tablet computer, a games console, a remote control device, a home automation controller or a domestic appliance including a domestic temperature or lighting control system, a toy, a machine such as a robot, an audio player, or a video player.

The device 900 comprises a microphone 902 for detecting ambient sounds, a speaker 904 for playback of voice or audio, and a haptic actuator 906 configured to cause the device 900 to vibrate.

Figure 10:
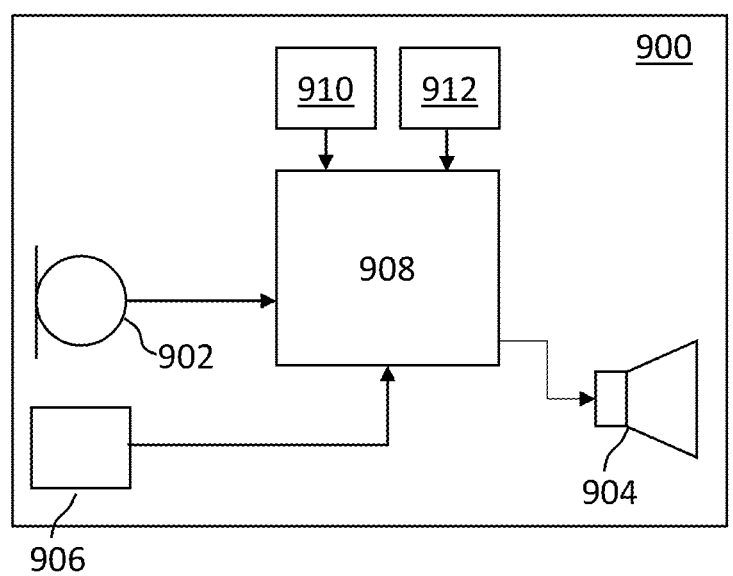
FIG. 10 is a schematic diagram of the device of FIG. 9.

FIG. 10 is a system schematic of the device 900.

A signal processor 908 of the headphone 900 is configured to receive a microphone signal from the microphone 902 and output audio signals to the loudspeaker 904. The device 900 may be configured for a user to listen to music or audio, to make telephone calls, to deliver voice commands to a voice recognition system, and/or other such audio processing functions. The device 900 may comprise other microphones and/or speakers (not shown) in communication with the signal processor 908.

The device 900 may further comprise a memory 910, which may in practice be provided as a single component or as multiple components. The memory 910 is provided for storing data and/or program instructions. The device 900 may further comprise a transceiver 912, which is provided for allowing the device 900 to communicate (wired or wirelessly) with external devices.

The device 900 further comprise the haptic actuator 906, which may be a linear resonant actuator (LRA). The haptic actuator 906 may be incorporated into or encapsulated in the body of the device 900, mechanically coupled to the device 900 such that actuation of the haptic actuator 906 causes the device to vibrate. Such vibration may be provided to alert a user to an event taking place on the device 900, such as receipt of a phone call, an alarm, a text message or the like.

The inventors have realised that vibration of the haptic actuator 906 of the device 900 creates sound having a particular acoustic characteristic. Due to the microphone 902 also being mechanically coupled to the body of the device 900, the microphone 902 may pick up the sound conducted through the body of the device 900 and/or acoustically coupled through the air and generates an electrical signal proportional to the effective sound pressure incident at the microphone 902.

The characteristics of the electrical signal derived by the microphone 902 may then be compared with one or more characteristics expected for the microphone under test. A determination of the condition of the microphone 902 can then be made. For example, if the characteristics of the derived signal do not match those expected, it may be determined that the microphone 902, specifically the MEMS structure of the microphone 902, is faulty.

To improve the robustness of the acoustic probe provided to the microphone 902, the haptic actuator 906 may be configured to output a sequence of vibrations.

The use of the haptic actuator 906 over the speaker 904 means that any test of the microphone 902 is less audible to a user of the device 900 whilst the haptic actuator 906 is still able to provide a strong acoustic stimulus to the microphone.

Figure 11:
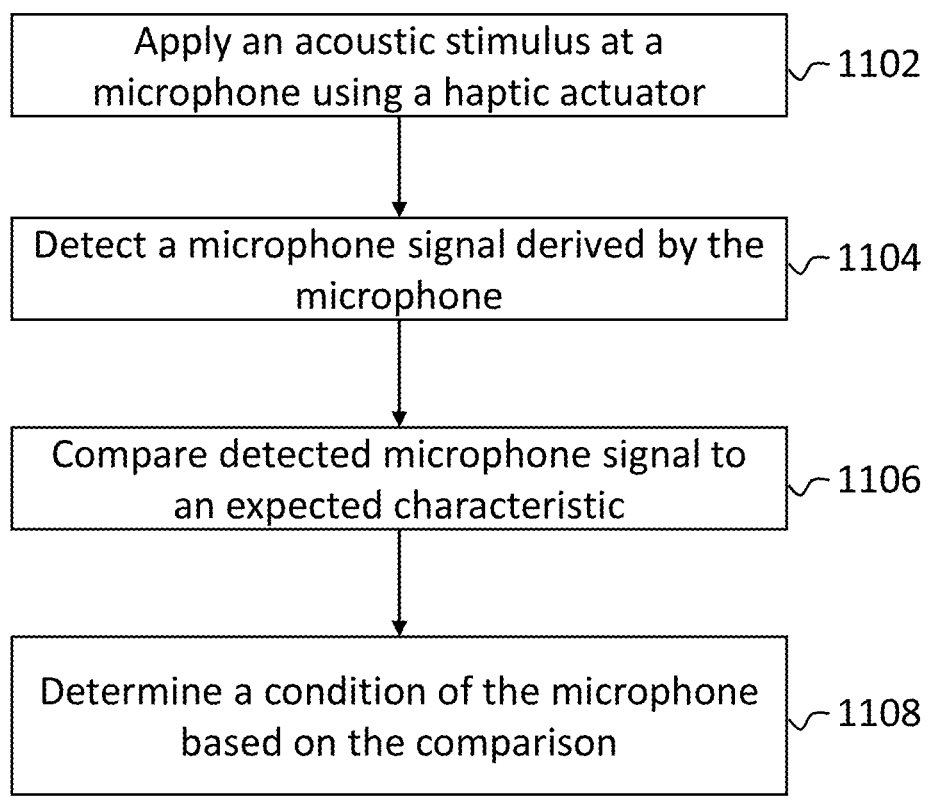
FIG. 11 is a flow diagram of a process according to embodiments of the present disclosure.

FIG. 11 illustrates a process for determining a condition of the microphone 902 of the device 900.

At step 1102, the processor 908 outputs a signal to the haptic actuator 906 which in turn generates one or more vibrations which cause an acoustic stimulus to be applied to the microphone 902 of the device 900. As mentioned above, the haptic actuator 906 may output a single vibration or a sequence of vibrations. Any sequence of vibrations is known and controlled by the processor 908.

At step 1104 the microphone 902 receives the acoustic stimulus generated by the haptic actuator 906 and generates an electrical audio signal based on the received acoustic stimulus.

At step 1106, the processor 908 retrieves one or more expected characteristics of the microphone from the memory 910. For example, the processor 908 may retrieve an expected frequency response of the derived microphone signal. The processor 908 then compares one or more characteristics of the detected microphone signal with the retrieved one or more expected characteristics.

At step 1108, based on the comparison, the processor 908 may then determine a condition of the microphone 902.

The above methods of acoustic stimulation may in some embodiments be used in conjunction with the methods of electrical stimulation and measurement described above with reference to FIGS. 3 to 8. For example, to rule out the possibility of fault detected during acoustic characterisation being due to something other than a MEMS fault, electrical testing as described with reference to FIGS. 3 to 8 may also be carried out.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method for detecting a microphone condition of a microphone, the method comprising:
    applying an electrical stimulus to a microphone;
    measuring an electrical response to the electrical stimulus at the microphone;
    comparing the electrical response to an expected response; and
    determining the microphone condition based on the comparison;
    wherein the electrical stimulus is applied to a power terminal of the microphone, wherein the electrical response is measured at the power terminal of the microphone; and
    wherein the electrical stimulus comprises a bias voltage for biasing the microphone, and wherein the electrical response comprises a bias current of the microphone.

2. The method of claim 1, wherein the electrical stimulus is applied to one or more audio output terminals of the microphone.

3. The method of claim 2, wherein the microphone is a single-ended microphone and the electrical stimulus is a single-ended current applied between one of the one or more audio output terminals and one of a ground terminal and a power terminal of the microphone.

4. The method of claim 2, wherein the microphone is a differential microphone and the electrical stimulus is a differential current applied between the audio output terminals of the microphone.

5. The method of claim 1, wherein measuring the electrical response further comprises:
    detecting a condition at the audio output terminals;
    determining an impedance of the microphone based on the detected condition at the audio output terminals; and
wherein comparing the electrical response to the expected response comprises:
    comparing the impedance to an expected impedance of the microphone.

6. The method of claim 5, wherein the impedance is a differential impedance or a single-ended impedance.

7. The method of claim 1, wherein one or more of a frequency, an amplitude, and a phase of the electrical stimulus is varied over time.

8. The method of claim 1, wherein one or more characteristics of the electrical stimulus are randomly or pseudo-randomly generated.

9. The method of claim 1, wherein the electrical stimulus comprises a plurality of frequency components.

10. The method of claim 1, wherein comparing the electrical response to the expected response comprises:
    determining one or more frequencies of the electrical response; and
    comparing the one or more frequencies with one or more expected frequencies of the expected response.

11. The method of claim 10, wherein the one or more frequencies of the electrical response are determined using a zero-crossing detector.

12. The method of claim 1, wherein comparing the electrical response to the expected response comprises:
    determining an amplitude of the electrical response; and
    comparing the amplitude with an expected amplitude of the expected response.

13. The method of claim 12, wherein the amplitude is determined for a single frequency bin of the electrical response and the expected amplitude is for a single frequency bin of the expected response, wherein the amplitude is determined for the single frequency bin of the electrical response using discrete Fourier transform, DFT, algorithm or a Goertzel algorithm.

14. The method of claim 1, wherein the bias voltage is varied over time during measurement of the bias current.

15. The method of claim 1, wherein the electrical stimulus is applied to a power terminal of the microphone, wherein the electrical response is measured at one or more output terminals of the microphone.

16. The method of claim 15, wherein measuring the electrical response comprises measuring a common-mode output voltage of the microphone or a common-mode output impedance of the microphone or a differential impedance of the microphone.

17. The method of claim 15, wherein the electrical stimulus applied to the power terminal of the microphone is modulated, wherein measuring the electrical response comprises measuring a power supply rejection, PSR, characteristic of the microphone, and wherein comparing the electrical response to the expected electrical response comprises comparing the PSR characteristic to an expected PSR characteristic of the microphone, wherein measuring the PSR characteristic comprises measuring a differential PSR or a common-mode PSR.

18. The method of claim 1, wherein the electrical response is compared to the expected response using a polynomial equation or a look-up table.

19. The method of claim 1, wherein determining the microphone condition comprises:
    determining a presence of a microphone or a fault in the microphone.

20. The method of claim 1, further comprising:
    applying a second electrical stimulus, one or more characteristics of the second electrical stimulus determined based on the comparison between the electrical response and the expected response.

21. The method of claim 1, wherein comparing the electrical response to the expected response comprises:
    determining a group delay associated with the microphone; and
    comparing the group delay with an expected group delay of the expected response.

22. The method of claim 21, wherein comparing the group delay comprises cross-correlating the electrical response with the expected response.

23. An apparatus for detecting a microphone condition of a microphone, the apparatus comprising processing circuitry and a non-transitory machine readable medium which, when executed by the processing circuitry, cause the apparatus to perform a method comprising:
    applying an electrical stimulus to a microphone;
    measuring an electrical response to the electrical stimulus at the microphone;
    comparing the electrical response to an expected response; and
    determining the microphone condition based on the comparison;
    wherein the electrical stimulus is applied to a power terminal of the microphone, wherein the electrical response is measured at the power terminal of the microphone; and
    wherein the electrical stimulus comprises a bias voltage for biasing the microphone, and wherein the electrical response comprises a bias current of the microphone.

* * * * *